United States Patent
Peiris et al.

(10) Patent No.: US 11,452,058 B2
(45) Date of Patent: Sep. 20, 2022

(54) APPARATUS AND METHOD FOR CELL DETECTION BY COMBINING SECONDARY SPREADING SEQUENCES

(71) Applicant: Samsung Electronics Co., Ltd., Gyeonggi-do (KR)

(72) Inventors: Bemini Hennadige Janath Peiris, San Diego, CA (US); Hongbing Cheng, San Diego, CA (US); Kee-Bong Song, San Diego, CA (US)

(73) Assignee: Samsung Electronics Co., Ltd

( * ) Notice: Subject to any disclaimer, the term of this patent is extended or adjusted under 35 U.S.C. 154(b) by 24 days.

(21) Appl. No.: 16/258,069

(22) Filed: Jan. 25, 2019

(65) Prior Publication Data

US 2020/0154382 A1 May 14, 2020

Related U.S. Application Data

(60) Provisional application No. 62/758,154, filed on Nov. 9, 2018.

(51) Int. Cl.
*H04W 56/00* (2009.01)
*H04B 1/709* (2011.01)
(Continued)

(52) U.S. Cl.
CPC .......... *H04W 56/003* (2013.01); *H04B 1/709* (2013.01); *H04J 11/0073* (2013.01);
(Continued)

(58) Field of Classification Search
CPC .. H04W 56/003; H04W 56/001; H04B 1/709; H04L 1/1861; H04L 5/0053; H04L 5/0094; H04L 27/2607
(Continued)

(56) References Cited

U.S. PATENT DOCUMENTS 6,456,608 B1 * 9/2002 Lomp .................... H04B 1/707
370/335
7,123,647 B1 10/2006 Sheng
(Continued)

FOREIGN PATENT DOCUMENTS

EP 2 437 453 4/2012
WO WO-2017142259 A1 * 8/2017

OTHER PUBLICATIONS

Amr G. Wassal, et al. "Efficient Implementation of Secondary Synchronization Symbol Detection in 3GPP LTE", IEEE, 2011, pp. 1680-1683.
(Continued)

*Primary Examiner* — Kwang B Yao
*Assistant Examiner* — Xuan Lu
(74) *Attorney, Agent, or Firm* — The Farrell Law Firm, P.C.

(57) ABSTRACT

An apparatus is provided. The apparatus includes a processor configured to receive a synchronization signal (SS) and identify timing of the SS based on a primary spreading signal (PSS) in the SS, identify tentative secondary spreading signals (SSSs) based on the identified timing, and group the tentative SSSs; a register configured to receive the SS; and a memory configured to store the tentative SSSs for each group of the tentative SSSs; wherein the processor is further configured to cross correlate the tentative SSSs, combine cross correlated outputs with weights by group, determine an SSS as the tentative SSS with a maximum combined cross correlation outputs, and determine a cell identification based on the determined SSS.

15 Claims, 11 Drawing Sheets

(51) Int. Cl.
    *H04J 11/00*     (2006.01)
    *H04L 1/18*     (2006.01)
    *H04L 5/00*     (2006.01)
    *H04L 27/26*     (2006.01)

(52) U.S. Cl.
    CPC ........ *H04J 11/0076* (2013.01); *H04L 1/1861* (2013.01); *H04L 5/0053* (2013.01); *H04L 5/0094* (2013.01); *H04L 27/2607* (2013.01); *H04W 56/001* (2013.01)

(58) Field of Classification Search
    USPC ........................................................ 370/329
    See application file for complete search history.

(56) References Cited

U.S. PATENT DOCUMENTS

| | | | |
|---|---|---|---|
| 9,065,630 B1* | 6/2015 | Xiao | H04W 56/0085 |
| 9,451,569 B1* | 9/2016 | Xiao | H04W 56/001 |
| 9,763,177 B1 | 9/2017 | Baskaran et al. | |
| 9,820,272 B1* | 11/2017 | Parvazi | H04J 11/0069 |
| 9,961,655 B1* | 5/2018 | Sivaraman | H04W 56/0015 |
| 10,044,403 B1 | 8/2018 | Peiris et al. | |
| 2002/0054621 A1 | 5/2002 | Kyeong et al. | |
| 2011/0092231 A1* | 4/2011 | Yoo | H04B 1/7097 455/501 |
| 2011/0223901 A1 | 9/2011 | Swarts et al. | |
| 2013/0273912 A1* | 10/2013 | Xu | H04W 48/16 455/434 |
| 2014/0071960 A1 | 3/2014 | Gorokhov et al. | |
| 2014/0071963 A1 | 3/2014 | Swarts et al. | |
| 2017/0054538 A1* | 2/2017 | Pu | H04J 11/0073 |
| 2018/0184391 A1* | 6/2018 | Ly | H04L 27/2657 |
| 2018/0331727 A1* | 11/2018 | John Wilson et al. | H04L 5/0091 |
| 2019/0132075 A1* | 5/2019 | Sun | H04L 1/0009 |
| 2019/0182002 A1* | 6/2019 | Lei | H04W 56/0015 |
| 2019/0313402 A1* | 10/2019 | Lei | H04W 72/0413 |
| 2020/0029302 A1* | 1/2020 | Cox | H04W 68/02 |
| 2021/0167884 A1* | 6/2021 | Chen | H04J 11/0076 |

OTHER PUBLICATIONS

Peng Wang, et al., "Secondary Synchronization Signal in 5G New Radio", IEEE, 2018, pp. 1-6.

Jukka Talvitie, et al., "Positioning of High-speed Trains using 5G New Radio Synchronizaton Signals", arXiv:1805.01830v1 [cs.IT], May 4, 2018, pp. 1-6.

* cited by examiner

APPARATUS AND METHOD FOR CELL DETECTION BY COMBINING SECONDARY SPREADING SEQUENCES

PRIORITY

This application claims priority under 35 U.S.C. § 119(e) to a U.S. Provisional Patent Application filed on Nov. 9, 2018 in the United States Patent and Trademark Office and assigned Ser. No. 62/758,154, the entire contents of which are incorporated herein by reference.

FIELD

The present disclosure relates generally to wireless communications systems, and more particularly, to an apparatus and a method for cell detection by combining secondary spreading sequences (SSSs).

BACKGROUND

The fifth generation (5G) mobile network is proposed as the next telecommunications standard beyond the current $4^{th}$ generation (4G) standard. In particular, fifth generation new radio (5G-NR) is part of a continuous mobile broad evolution process to meet the requirements of 5G. 5G-NR aims to provide better levels of latency, reliability, and security, to enable connectivity of a massive number of Internet of things (IoT) devices and other types of mission-critical services.

A major challenge of using millimeter wave (mmWave) for 5G access is to establish a link between a base station and a user equipment (UE) amidst higher path loss and rapidly changing channel conditions between the base station and the UE. At mmWave frequencies, a small variation in the environment can change the condition of a channel and affect receiver performance. Analog beam sweeping and beam tracking techniques are needed in massive multiple input multiple output (MMIMO) systems to create highly directed beams that facilitate establishing a proper link between a base station and a UE. Beam steering is needed for initial access where a reliable link is established between a base station and a UE. Once a link is established, a beam tracking technique is required to maintain the link between a base station and a UE. Otherwise, at mmWave frequencies, due to environmental changes, received signal strength may be reduced significantly leading to a disconnection of the link between the base station and the UE.

FIG. 1 is an illustration of a synchronization (synch) signal (SS) block 100 in NR.

Referring to FIG. 1, the sync signal block 100 is formed by concatenating a primary spreading sequence (PSS) 101, a secondary spreading sequence (SSS) 103, and physical broadcast channel (PBCH) sequences 105. The synch signal block 100 may also include a cyclic prefix (CP) 107.

During a first phase of an initial acquisition, the PSS 101 is used to obtain timing information and a primary cell identification (ID) $N_{ID}^{(2)}$. Once the timing information is obtained, the PSS 101 may also be used to estimate a channel between a base station and a UE which may later be used for coherent detection of the SSS 103. To obtain the cell ID, it is required to detect the SSS 103. The SSS 103 provides a secondary cell ID (SID) $N_{ID}^{(1)}$ and together with the primary cell ID (PID) $N_{ID}^{(2)}$ obtained through the PSS detection phase, the cell ID may be computed as $3N_{ID}^{(1)} + N_{ID}^{(2)}$.

According to section 4.1 of the $3^{rd}$ generation partnership project (3GPP) technical specification (TS) 38.213, candidate locations for SS blocks are specified as follows:

Case A—15 kHz subcarrier spacing: the first symbols of the candidate SS/PBCH blocks have indexes of {2, 8}+14*n. For carrier frequencies less than or equal to 3 GHz, n=0, 1. For carrier frequencies greater than 3 GHz and less than or equal to 6 GHz, n=0, 1, 2, 3.

Case B—30 kHz subcarrier spacing: the first symbols of the candidate SS/PBCH blocks have indexes {4, 8, 16, 20}+28*n. For carrier frequencies less than or equal to 3 GHz, n=0. For carrier frequencies greater than 3 GHz and less than or equal to 6 GHz, n=0, 1.

Case C—30 kHz subcarrier spacing: the first symbols of the candidate SS/PBCH blocks have indexes {2, 8}+14*n. For carrier frequencies less than or equal to 3 GHz, n=0, 1. For carrier frequencies greater than 3 GHz and less than or equal to 6 GHz, n=0, 1, 2, 3.

Case D—120 kHz subcarrier spacing: the first symbols of the candidate SS/PBCH blocks have indexes {4, 8, 16, 20}+28*n. For carrier frequencies greater than 6 GHz, n=0, 1, 2, 3, 5, 6, 7, 8, 10, 11, 12, 13, 15, 16, 17, 18.

Case E—240 kHz subcarrier spacing: the first symbols of the candidate SS/PBCH blocks have indexes {8, 12, 16, 20, 32, 36, 40, 44}+56*n. For carrier frequencies greater than 6 GHz, n=0, 1, 2, 3, 5, 6, 7, 8.

Standards allow the synchronization signal to include multiple SS blocks 100. A way of detecting the SSS 103 is for a receiver to first lock onto the strongest PSS 101 to obtain the correct timing of an SS block 100 start position and then perform primary cell detection and channel estimation. Since the time separation between the PSS 101 and the SSS 103 is defined in a standard, once the PSS timing is known, timing of the start of the SSS will be known, and it is possible to detect the SSS 103 within SS blocks 100. However, the success of SSS detection depends on the noise and interference level of the environment. For example, in a noise and interference dominant environment, there is a possibility of significant false alarm and miss detection.

SUMMARY

According to one embodiment, an apparatus includes a processor configured to receive an SS and identify timing of the SS based on a PSS in the SS, identify tentative SSSs based on the identified timing, and group the tentative SSSs; a register configured to receive the SS; and a memory configured to store the tentative SSSs for each group of the tentative SSSs; wherein the processor is further configured to cross correlate the tentative SSSs, combine cross correlated outputs with weights by group, determine an SSS as the tentative SSS with a maximum combined cross correlation outputs, and determine a cell identification based on the determined SSS.

According to one embodiment, a method includes receiving repetitions of an SS; identifying timing of the SS using a PSS; identifying tentative SSSs based on the identified timing; grouping the tentative SSSs that can be grouped; cross correlating the tentative SSSs; combining cross correlated outputs with weights by group; determining an SSS as the tentative SSS with a maximum combined cross correlation output; and determining a cell identification (ID) based on the determined SSS.

According to one embodiment, an apparatus includes a processor configured to receive a synchronization signal (SS) and identify timing of the SS based on a primary spreading signal (PSS) in the SS, identify tentative secondary spreading signals (SSSs) based on the identified timing, and group n tentative SSSs into each of n groups, where n is an integer; a register configured to receive the SS; n×n SSS correlators, where each of the n SSS correlators is connected to one of the n tentative SSSs in one of the n groups and includes a locally generated SSS; n×n multipliers, where each of the n multipliers is connected to one of the n SSSs correlators and receives a weight; and n adders, where each of the n adders is connected to n of the n SSSs multipliers associated with one of the n groups, respectively, where an output of each of the n adders is connected to the processor, wherein the processor is further configured to determine an SSS as the tentative SSS with a maximum output of the n adders, and determine a cell identification based on the determined SSS.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
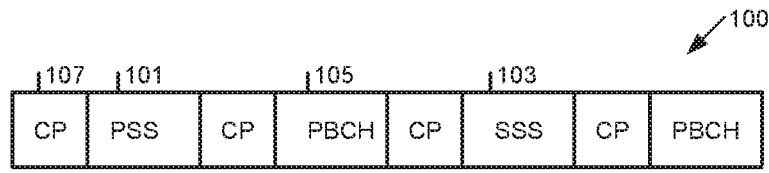
FIG. 1 illustrates a synchronization signal block, according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The present disclosure concerns an apparatus and a method for exploiting the structure in an SS and using that information to appropriately combine multiple SSS signals from multiple SS blocks to improve cell detection performance of a receiver in a 5G-NR system. In the presence of multiple SS blocks, if a receiver can exploit the structure of the SS block repetition format, then there is room to significantly improve the sensitivity of SSS detection by combining multiple SSSs from multiple SS blocks.

Figure 2:
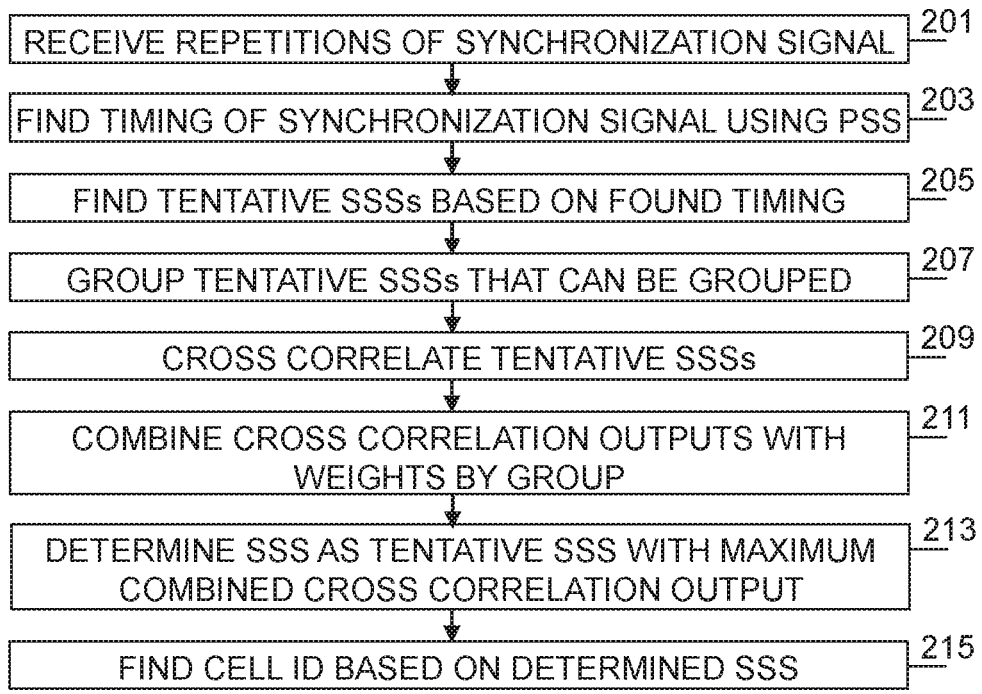
FIG. 2 is a flowchart of a method of determining a cell ID, according to one embodiment.

FIG. 2 is a flowchart of a method of determining a cell ID, according to one embodiment.

Referring to FIG. 2, at 201, the method receives repetitions of an SS. In an embodiment, a signal burst with a PSS and an SSS with multiple repetitions of the burst with a timing pattern is received.

At 203, the method determines a timing of the SS using a PSS in the SS. Since there is no information regarding SSS locations at the beginning of a synchronization phase, tentative SSS candidate timing locations are obtained through a PSS detection phase. However, the candidate SSS locations obtained through PSS correlation are numerous and there is no direct information of timing separation among multiple SS blocks.

At 205, the method identifies tentative SSSs based on the found timing. In an embodiment, a group of SSS candidates are identified that may be combined based on the found timing and a defined timing pattern of the SS. SS blocks within an SS are not necessarily equally spaced and are not guaranteed to be present at candidate locations. Thus, SSS candidate locations must be carefully selected. In the present disclosure, a two dimensional table is generated to record timing candidate SSS locations, where each row of the table consists of candidate timings for candidate SSSs to be combined. The table is filled with multiple candidates of timing groups and, the timing for the SSSs may be selected based on PSS correlation values and the relative locations of the candidate SS blocks. In an embodiment, a modified set of candidate SSS locations are identified to reduce hardware complexity.

At 207, the method groups the tentative SSSs that can be grouped.

At 209, the method cross-correlates the tentative SSSs with weights. Irrespective of whether the SS consists of single or multiple SS blocks, a way of detecting an SSS sequence is to first cross correlate the SS with an SSS code book using a sliding window SSS correlation. Once the candidate SSS locations and groups are selected, each tentative SSS signal is cross-correlated with locally generated SSS candidates. Once the candidate SSS locations and groups are selected, the tentative SSS signal in each group is cross correlated with a locally generated SSS hypothesis. Correlator outputs in each timing group are combined according to weights $w_{i,j}$ $1 \leq i \leq 3$, $1 \leq j \leq 3$ and the final combined output is the decision metric for that individual SSS hypothesis. In other words, the SSS sequence is selected by choosing the SSS hypothesis that gives the maximum combined correlation output.

At 211, the method combines the cross correlation outputs with weights by group. The group of SSSs may be combined with weightings to enhance detector sensitivity. In the presence of multiple SSS blocks, the present disclosure combines SSS signals from multiple SS blocks to improve the reliability of detecting an SSS sequence and cell ID, especially in a noise dominant environment. Correlator outputs are combined according to suitable weights $w_{i,j}$ $1 \leq i \leq 3$, $1 \leq j \leq 3$ and the final combined output is a decision metric for that individual SSS hypothesis. The SSS sequence is selected by finding the SSS hypothesis that gives the maximum combined correlation output.

At 213, the method determines an SSS as the tentative SSS with the maximum combined cross correlation output.

At 215, the method determines a cell ID based on the determined SSS.

To avoid falsely recognizing an unavailable SS block as an available SS block, a thresholding scheme is employed to eliminate the false detection of unavailable SS block locations.

Embodiments of the SSS grouping and combining scheme may work for a defined observation window that covers a complete set of candidate locations, which may be referred to as a synchronization signal period. However, the observation of the sync signal over a longer observation period and computing the required intermediate values for SSS combining may be hardware intensive. Hardware latency and computation complexity may be reduced where an observation is performed over multiple shortened observation windows.

During each observation period, PSS and SSS detection is performed without combining. Multiple PSS timing candidates with the corresponding cross correlations values and the corresponding SSS candidates with corresponding cross correlation values and channel gain are recorded. The reported number of candidates is limited to reduce the storage requirement. These intermediate values are reported to software (SW) by hardware (HW).

At the end of the multiple shortened observation periods, based on the accumulated PSS timings, SW generates a grouping table that provides candidate locations of SSS signals to be combined. Once the candidate location and grouping information is obtained, the SSS correlation values are combined with proper weighting factors to choose the SSS hypothesis.

Figure 3:
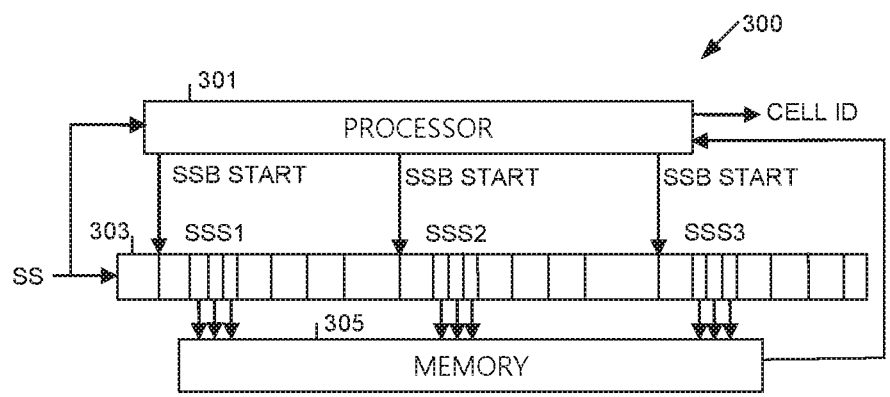
FIG. 3 is a block diagram of an apparatus for determining a cell ID, according to one embodiment.

FIG. 3 is a block diagram of an apparatus 300 for determining a cell ID, according to one embodiment.

Referring to FIG. 3, the apparatus 300 includes a processor 301, a register 303, and a memory 305.

The processor 301 and the register 303 are configured to receive repetitions of an SS. In an embodiment, a signal burst with a PSS and an SSS with multiple repetitions of the burst with a timing pattern is received. The processor 301 determines a timing of the SS using a PSS in the SS. Since there is no information regarding SSS locations at the beginning of a synchronization phase, tentative SSS candidate timing locations are obtained through a PSS detection phase. However, the candidate SSS locations obtained through PSS correlation are numerous and there is no direct information of timing separation among multiple SS blocks.

The processor 301 is further configured to identify tentative SSSs based on the found timing and groups the tentative SSSs that can be grouped. In an embodiment, a group of SSS candidates are identified that may be combined based on the found timing and a defined timing pattern of the SS. SS blocks within an SS are not necessarily equally spaced and are not guaranteed to be present at candidate locations. Thus, SSS candidate locations must be carefully selected. In the present disclosure, a two dimensional table is generated to record timing candidate SSS locations, where each row of the table consists of candidate timings for candidate SSSs to be combined. The table is filled with multiple candidates of timing groups, and the timing for the SSSs may be selected based on PSS correlation values and the relative locations of the candidate SS blocks. In an embodiment, a modified set of candidate SSS locations is identified to reduce hardware complexity.

The memory 305 is configured to store the groups of tentative SSSs identified by the processor 301 and transmits the groups of tentative SSSs to the processor 301.

The processor 301 is further configured to cross correlate the tentative SSSs with weights. Irrespective of whether the SS consists of single or multiple SS blocks, a way of detecting an SSS sequence is to first cross correlate the SS with an SSS code book using a sliding window SSS correlation. Once the candidate SSS locations and groups are selected, each tentative SSS signal is cross-correlated with locally generated SSS candidates. Correlator outputs in each timing group are combined according to weights $w_{i,j}$, $1 \le i \le 3$, $1 \le j \le 3$ and the final combined output is the decision metric for that individual SSS hypothesis. In other words, the SSS sequence is selected by choosing the SSS hypothesis that gives the maximum combined correlation output.

The processor 301 is further configured to combine cross correlation outputs with weights by group. The group of SSSs may be combined with weightings to enhance detector sensitivity. In the presence of multiple SSS blocks, the present disclosure combines SSS signals from multiple SS blocks to improve the reliability of detecting an SSS sequence and cell ID, especially in a noise dominant environment. Correlator outputs are combined according to suitable weights $w_{i,j}$ $1 \le i \le 3$, $1 \le j \le 3$ and the final combined output is a decision metric for that individual SSS hypothesis. The SSS sequence is selected by finding the SSS hypothesis that gives the maximum combined correlation output.

The processor 301 is further configured to determine an SSS as the tentative SSS with the maximum combined cross correlation output and determine a cell ID based on the determined SSS.

Figure 4:
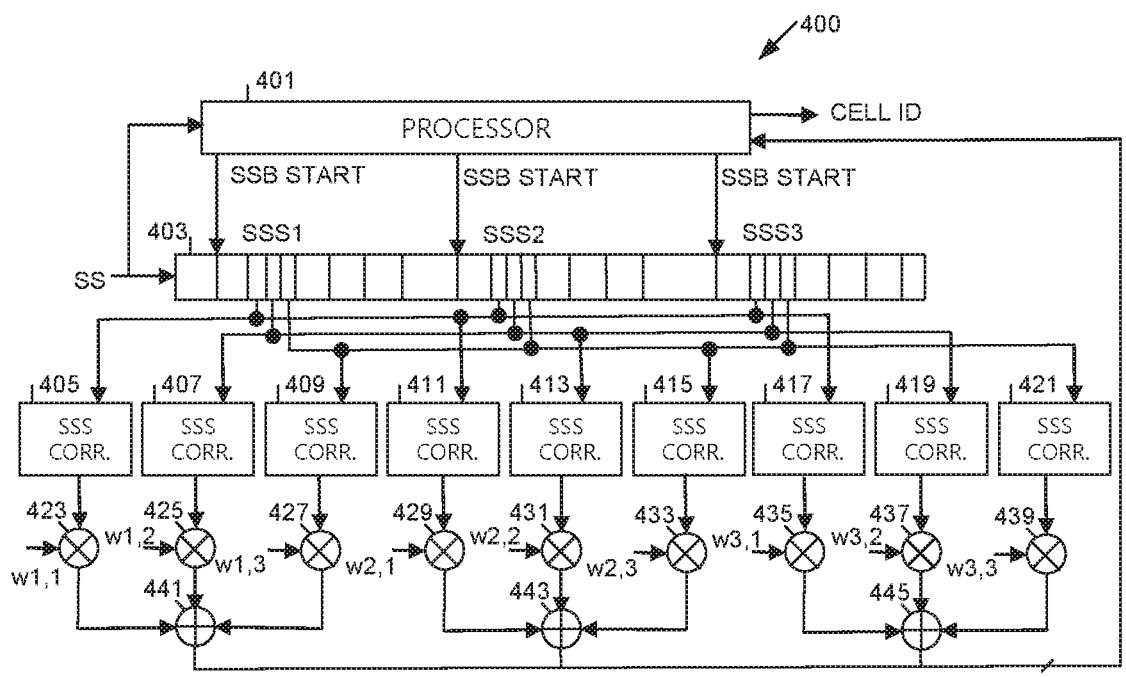
FIG. 4 is a block diagram of an apparatus for determining a cell ID, according to one embodiment.

FIG. 4 is a block diagram of an apparatus 400 for determining a cell ID, according to one embodiment.

Referring to FIG. 4, the apparatus 400 includes a processor 401, a register 403, a first SSS correlator 405, a second SSS correlator 407, a third SSS correlator 409, a fourth SSS correlator 411, a fifth SSS correlator 413, a sixth SSS correlator 415, a seventh SSS correlator 417, an eighth SSS correlator 419, a ninth SSS correlator 421 (e.g., n×n SSS correlators, where n is 3), a first multiplier 423, a second multiplier 425, a third multiplier 427, a fourth multiplier 429, a fifth multiplier 431, a sixth multiplier 433, a seventh multiplier 435, an eighth multiplier 437, a ninth multiplier 439 (e.g., n×n SSS multipliers, where n is 3), a first adder 441, a second adder 443, and a third adder 445 (e.g., n adders, where n is 3).

The processor 401 and the register 403 are configured to receive repetitions of an SS. In an embodiment, a signal burst with a PSS and an SSS with multiple repetitions of the burst with a timing pattern is received. The processor 401 determines a timing of the SS using a PSS in the SS. Since there is no information regarding SSS locations at the beginning of a synchronization phase, tentative SSS candidate timing locations are obtained through a PSS detection phase. However, the candidate SSS locations obtained through PSS correlation are numerous and there is no direct information of timing separation among multiple SS blocks.

The processor 401 is further configured to identify tentative SSSs based on the found timing and groups the tentative SSSs that can be grouped. In an embodiment, a group of SSS candidates are identified that may be combined based on the found timing and a defined timing pattern of the SS. FIG. 4 illustrates an example where three (e.g., n is 3) groups of three SSS candidates are identified. However, the present disclosure is not limited to identifying three groups of three SSS candidates. Any number of groups of any number of SSS candidates may be identified by the present disclosure. SS blocks within an SS are not necessarily equally spaced and are not guaranteed to be present at candidate locations. Thus, SSS candidate locations must be carefully selected. In the present disclosure, a two dimensional table is generated to record timing candidate SSS locations, where each row of the table consists of candidate timings for candidate SSSs to be combined. The table is filled with multiple candidates of timing groups, and the timing for the SSSs may be selected based on PSS correlation values and the relative locations of the candidate SS blocks. In an embodiment, a modified set of candidate SSS locations is identified to reduce hardware complexity.

The first SSS correlator 405, the second SSS correlator 407, and the third SSS correlator 409 are connected to the register 403 to receive the first identified tentative SSS candidates from the three identified groups, respectively. The fourth SSS correlator 411, the fifth SSS correlator 413, and the sixth SSS correlator 415 are connected to the register 403 to receive the second identified tentative SSS candidates from the three identified groups, respectively. The seventh SSS correlator 417, the eighth SSS correlator 419, and the ninth SSS correlator 421 are connected to the register 403 to receive the third identified tentative SSS candidates from the three identified groups, respectively. Each tentative SSS signal is cross-correlated with locally generated SSS candidates in each of the SSS correlators.

Each of the first multiplier 423, the second multiplier 425, the third multiplier 427, the fourth multiplier 429, the fifth multiplier 431, the sixth multiplier 433, the seventh multiplier 435, the eighth multiplier 437, and the ninth multiplier 439 receives a weight $w_{1,1}, w_{1,2}, w_{1,3}, w_{2,1}, w_{2,2}, w_{2,3}, w_{3,1}, w_{3,2}$, and $w_{3,3}$, respectively. The first multiplier 423 is connected to the first SSS correlator 405. The second multiplier 425 is connected to the second SSS correlator 407. The third multiplier 427 is connected to the third SSS correlator 409. The fourth multiplier 429 is connected to the fourth SSS correlator 411. The fifth multiplier 431 is connected to the fifth SSS correlator 413. The sixth multiplier 433 is connected to the sixth SSS correlator 415. The seventh multiplier 435 is connected to the seventh SSS correlator 417. The eighth multiplier 437 is connected to the eighth SSS correlator 419. The ninth multiplier 439 is connected to the ninth SSS correlator 421.

The first adder 441 includes inputs connected to the outputs of the first multiplier 423, the second multiplier 425, and the third multiplier 427, respectively, and includes an output connected to the processor 401 via an output bus. The second adder 443 includes inputs connected to the outputs of the fourth multiplier 429, the fifth multiplier 431, and the sixth multiplier 433, respectively, and includes an output connected to the processor 401 via the output bus. The third adder 445 includes inputs connected to the outputs of the seventh multiplier 435, the eighth multiplier 437, and the ninth multiplier 439, respectively, and includes an output connected to the processor 401 via the output bus.

The processor 401 is further configured to determine an SSS as the tentative SSS with the maximum combined cross correlation output from the outputs of the first adder 441, the second adder 443, and the third adder 445, and determine a cell ID based on the determined SSS.

5G NR standards allow the SS to include multiple SS blocks. A method of detecting an SSS is by a receiver first locating the maximum PSS to obtain the correct timing of the SS block start position and perform primary cell detection and channel estimation. Since the time separation between a PSS and an SSS is defined in the standard, once the PSS timing is known, timing of the start of an SSS is known and it is possible to detect an SSS within SS blocks. However, the success of SSS detection depends on the noise and interference level of the environment. In a noise or interference dominant environment, there is a possibility of significant false alarm and miss detection. In the presence of multiple SS blocks, the receiver may exploit the structure of the SS block repetition format to significantly improve the sensitivity of the SSS detections by combining multiple SSSs from multiple SS blocks.

However, the SSSs must be combined with correct timing instances. Therefore, a timing group may be defined as follows. Within a timing group, timing differences between any two elements is always a timing difference between two valid SSBs defined in an SSB burst set. SSSs with timings that belong to the same timing group may be combined. Each SSS in a timing group passes through an SSS correlator and is then combined with appropriate weighting factors $w_{i,j}$, where $w_{i,j}$ is the weighting factor of the SSS of a jth timing instant in an ith timing group. After combining SSSs, a cell ID and a timing corresponding to the maximum value of the combined metric is determined as the cell ID and timing. To identify the timing groups, PSS correlation values and their timings are used.

A method of identifying timing groups through PSS correlation and timings is described below.

Figure 5:
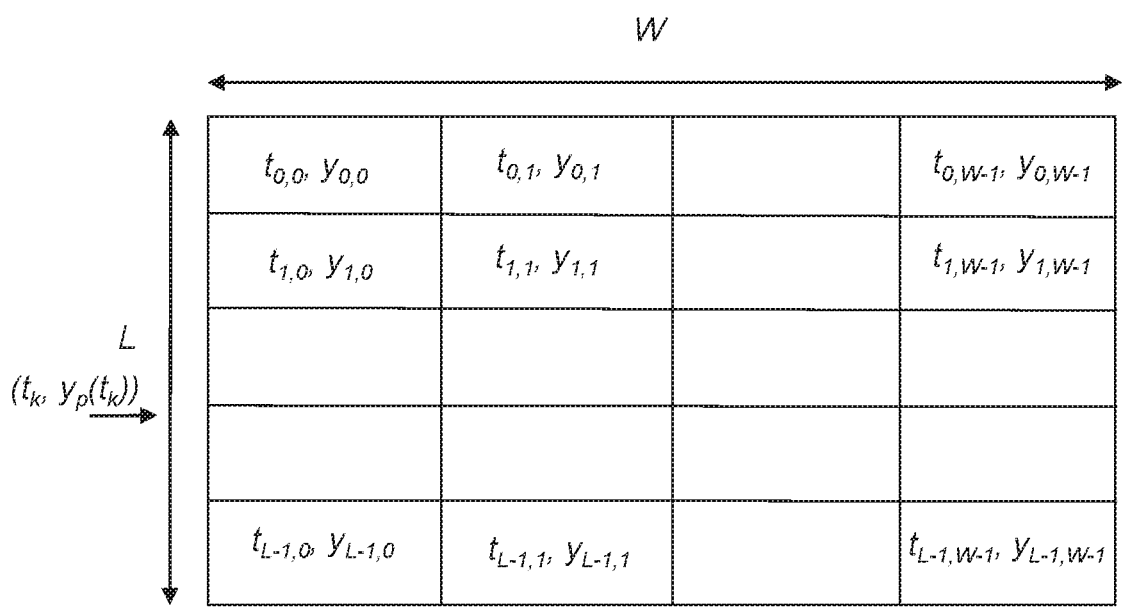
FIG. 5 is a PSS grouping table for timing and cross correlation, according to one embodiment.

FIG. 5 is a PSS grouping table for timing and cross correlation, according to one embodiment.

Referring to FIG. 5, for a given case number x (section 4.1 of 3GPP TS 38.213) and carrier frequency f, the timing differences between any valid SS blocks is known and is defined by a set $\zeta_{x,f}$. The details of the set selections are described below. W is the number of candidates in each timing group. L is the number of timing groups. For PID hypothesis p, $y_p(t_k)$ is the PSS correlator output at timing index $t_k$. $l_{observe}$ is the length of the observation window for SSS grouping in number of samples. The grouping table has length L and width W and is populated with timings and PSS correlation values.

Timing and correlation values at an rth row and a cth column of the grouping table are defined as $(t_{r,c}, y_{r,c})$. An order of searching the table may be from top to bottom along a column, and from left to right along a row.

In a first step, the table is initialized with $t_{r,c}=0$, $y_{r,c}=-100$ for $\forall r=0, 1, \ldots, L-1$ and $\forall c=0, 1, \ldots, W-1$.

In a second step, for $\forall(t_k, y_p(t_k))$ reported within $0 \le k < l_{observe}$, do the following:

(r*, c*) search:
Find r* s.t. $t_k - t_{r^*,0} \in \zeta_{x,f}$ or $y_{r^*,0} = -100$.
if exist, if $y_p(t_k) > y_{r^*, L-1}$ c*=L-1
else discard $(t_k, y_p(t_k))$ and skip step 4.
else,
if $y_p(t_k) > y_{0,0}$, replace: $t_{0,0}=t_k$, $y_{0,0}=y_p(t_k)$, $t_{0,c}=0$, $y_{0,c}=-100$ for $\forall c=1, \ldots, W-1$
else discard $(t_k, y_p(t_k))$ and skip step 4.

If $\exists r^*$
i. Sort row r* in descending order based on the $y_{r^*,c}$ where, $\forall c=0, 1, \ldots, W-1$.
ii. Sort all the rows in the table in ascending order based on $y_{r,0}$.

A method of combining SSSs is described below.

For each PID, for each timing hypothesis r, a fast Fourier transform (FFT) output of an SSS in a jth strongest SS block $Y_{r,j}(k)$ is given by Equation (1):

$$Y_{r,j}(k) = H(k)_{r,j} X(k) + N_{r,j}(k) \qquad (1)$$

$H(k)_{r,j}$ is a frequency domain channel between a base station and a UE for the kth subcarrier. Correspondingly, $\hat{H}_{r,j}^*(k)$ is an estimated channel, $X(k)$ is a transmitted SSS signal and $N_{r,j}(k)$ is noise, and $0 \ll k < 255$. SSS may be oversampled by a factor 2.

The metric corresponding to SSS correlation is given by Equation (2):

$$\text{metric}(s_{r,j}) = \sum_{k=0}^{255} \frac{Y_{r,j}(k)(1-2s^{m_0}(k))\hat{H}_{r,j}^*(k)(1-2s^{m_1}(k))}{\sum_{k'=0}^{126} |Y_{r,j}(k') \cdot \hat{H}_{r,j}^*(k')|} \qquad (2)$$

For each timing index (row r), multiple SSS signals in multiple SS blocks are combined, the more reliable metric for SSS at r timing index is obtained, and the corresponding initial state for constituent m sequences of an SSS sequence is given by Equations (3) and (4):

$$m_{1,r}, m_{0,r} = \arg\max_{m_{1,r}, m_{0,r}} \{\text{metric}(s_r)\} \qquad (3)$$

$$\text{where metric}(s_r) = \frac{\sum_{j \in j\_valid} w_{r,j} \text{metric}(s_{r,j})}{\sum_{j \in j\_valid} w_{r,j}} \qquad (4)$$

and where m0 and m1 are the initial phases of the constituent m sequences of SSS and j_valid is the set of valid SSS candidates at the rth timing index.

If the set of valid candidates is in a timing group, combining weights are selected as the average channel power $$w_{r,j} = \frac{\sum_{k=0}^{255} |\hat{H}_{r,j}^*(k')|^2}{256}$$

and is obtained from channel estimation using a relevant PSS sequence.

For each PID hypothesis and each timing hypothesis r, $N_p$ best candidates based on the metric $(s_r)$ are selected totaling $L^*N_p^*3$ candidates for the final pool. The candidates may be sorted according to the metric $(s_r)$ while removing the duplicated cell IDs and timings to narrow down to a lesser number of candidates. The best sorted candidate is considered as the serving cell while the next best n candidates are considered as the detected n weak cells candidates.

Figure 6:
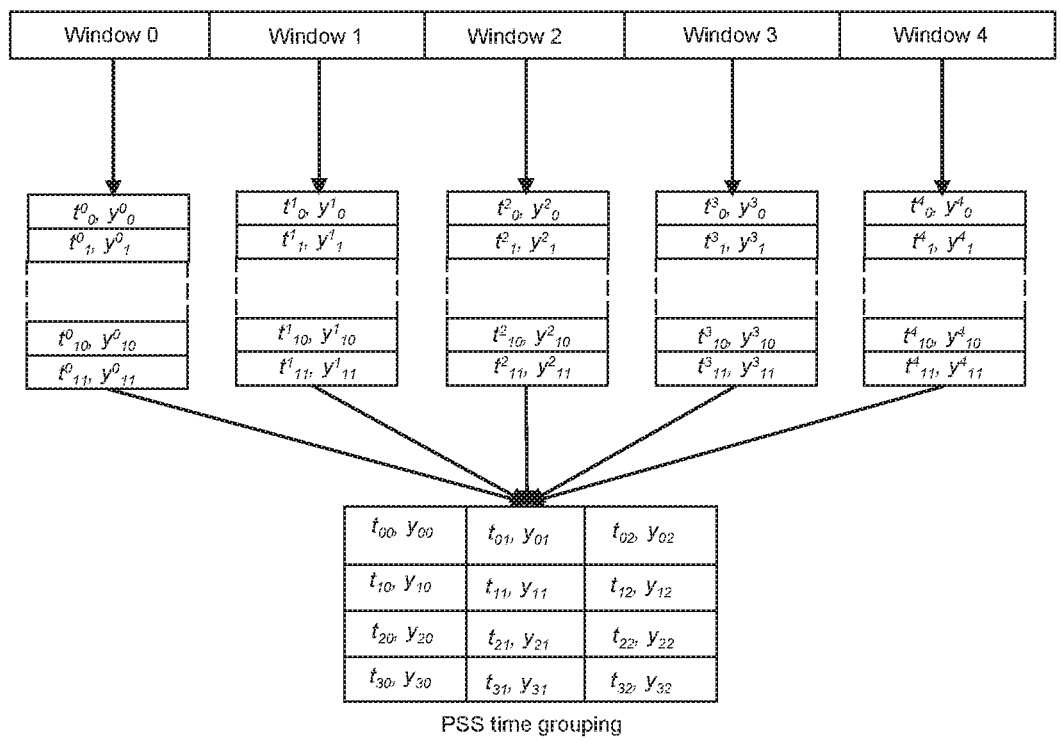
FIG. 6 is an illustration of combining PSS timings obtained from multiple shortened observation windows to form a single PSS grouping table, according to one embodiment.

FIG. 6 is an illustration of combining PSS timings obtained from multiple shortened observation windows to form a single PSS grouping table, according to one embodiment.

Referring to FIG. 6, for the description above, timing/correlation values of PSS candidates and corresponding SSS correlation values are reported at an end of a full observation window (e.g., default, 5 ms). No intermediate results are reported within the defined observation period. However, the observation period may be shortened to reduce the acquisition time. For example, per each PID hypothesis, hardware may report $N_p$ best PSS peaks, their timing and also corresponding $N_s$ best SSS correlation outputs per PSS peak for each shortened observation period. This shortened observation period may be set to be 0.5 ms, 1 ms, 2 ms etc. With a shortened observation window, SW may still perform SSS grouping and combining based on the reported PSS correlation/timing and SSS correlation values. An SW grouping and combining method is described below.

During each shortened observation period, $N_p$ PSS correlations/timings and corresponding $N_s$ best SSS correlation values for each PID/timing and their corresponding cell IDs are reported to SW from HW. The total number of SSS candidates reported to SW is $3N_pN_s$ (number of PID=3, PSS timing candidates per PID=$N_p$, SSS candidates per PID=$N_s$). Channel gain for each PID and each SSS timing candidate are reported to SW. Total channel gains reports per PID, per shortened observation window is $N_p$.

At the end of the multiple shortened observation periods, PSS grouping are performed and a PSS grouping table with valid timing groups is generated. Based on the PSS grouping table, valid SSSs to be combined are identified and SSS correlation values are combined using already reported SSS correlations and channel gains by HW to SW. Cell ID and timing is detected based on the timing and SID related to the maximum combined SSS correlation.

A set including timing differences between two valid SSBs is described below.

Mappings between an SSB separation and extra samples introduced assuming SS is oversampled by a factor of 2, where each symbol has 274 samples for a CP, are described below.

For a subcarrier spacing (SCS) of 15 KHz, symbol locations of candidate SSBs are given by Equation (5):

$$\{2, 8\} + 14n, n = \begin{cases} 0, 1 \text{ if } & f <= 3 \text{ GHz} \\ 0, 1, 2, 3 \text{ if } & 3 \text{ GHz} < f < 6 \text{ GHz} \end{cases} \quad (5)$$

Correspondingly, the number of samples between any two candidate SS blocks is given by Equation (6):

$$\xi_{Case A,f} = \{-6N - C, 0, 6N + C\} + 14nN + 2nC, N = 274, \quad (6)$$

$$C = 2, \text{ where } n = \begin{cases} 0, 1 \text{ if } & f <= 3 \text{ GHz} \\ 0, 1, 2, 3 \text{ if } & 3 \text{ GHz} < f < 6 \text{ GHz} \end{cases}$$

For an SCS of 30 KHz, 30k_pattern=1, symbol locations of candidate SSBs are given by Equation (7):

$$\{4, 8, 16, 20\}N + 28n, \quad (7)$$

$$\text{where } n = \begin{cases} 0 \text{ if } & f <= 3 \text{ GHz} \\ 0, 1 \text{ if } & 3 \text{ GHz} < f < 6 \text{ GHz} \end{cases}$$

Correspondingly, the number of samples between any two candidate SS blocks is given by Equation (8):

$$\xi_{Case B,f} = \left\{4N(7n+m) + \left(2n + \left\lfloor \frac{m}{2} \right\rfloor\right)C\right\}, N = 274, C = 4, \quad (8)$$

$$m = \mp 0, \mp 1, \mp 2, \mp 3$$

$$\text{where } n = \begin{cases} 0 \text{ if } & f <= 3 \text{ GHz} \\ 0, 1 \text{ if } & 3 \text{ GHz} < f < 6 \text{ GHz} \end{cases}$$

For an SCS of 30 KHz, 30k_pattern=2, symbol locations of candidate SSBs are given by Equation (9):

$$\{2, 8\} + 14n, n = \begin{cases} 0, 1 \text{ if } & f <= 3 \text{ GHz} \\ 0, 1, 2, 3 \text{ if } & 3 \text{ GHz} < f < 6 \text{ GHz} \end{cases} \quad (9)$$

Correspondingly, the number of samples between any two candidate SS blocks is given by Equation (10):

$$\xi_{Case C,f} = \{-6N, 0, 6N\} + 14nN + nC, N = 274, C = 4, \quad (10)$$

$$\text{where } n = \begin{cases} 0, 1 \text{ if } & f <= 3 \text{ GHz} \\ 0, 1, 2, 3 \text{ if } & 3 \text{ GHz} < f < 6 \text{ GHz} \end{cases}$$

For an SCS of 120 KHz, symbol locations of candidate SSBs are given by Equation (11):

$$\{4,8,16,20\}+28n, n=0,1,2,3,5,6,7,8,10,11,12,13,15 16, 17,18 \quad (11)$$

Correspondingly, the number of samples between any two candidate SS blocks is given by Equation (12):

$$\xi_{Case\ D,mmWave} = \{[4m+28n']N+\lfloor n'/2 \rfloor C\},$$
$$C=16, m=\mp 0,\mp 1,\mp 2,\mp 3,\mp 4\ n'=0,1,2,3,5,6,7,8,$$
$$10,11,12,13,15,16,17,18 \quad (12)$$

For an SCS of 240 KHz, symbol locations of candidate SSBs are given by Equations (13) and (14):

$$\{8,12,16,20,32,36,40,44\}+56n, n=0,1,2,3,5,6,7,8 \quad (13)$$

$$\xi_{CaseE,mmWave} = \{[4m+56n']N+\lfloor n'/2 \rfloor C\}, C=32,$$
$$m=\mp 0,\mp 1,\ldots,\mp 9, n'=0,1,2,3,5,6,7,8 \quad (14)$$

While the sets above provide a complete set of SSB separation for each case in section 4.1 of 3GPP TS 38.213, a set of SS candidate locations to reduce the computational complexity of the grouping method is given by schemes 1 and 2 in Equations (15) and (16), respectively:

$$\xi^1_{x,f}\{4nN+\Delta^1_{x,f}(n)\}, n \text{ is any positive integer} \quad (15)$$

where, $\Delta^1_{x,f}(n)$ depends on the subcarrier separation, 30K pattern and the frequency. Scheme 1 accounts for extra samples introduced to CP at 0.5 ms boundary. For cases D and E above, ignoring extra samples, the SSBs are always separated by an integer multiple of SS block length. Thus, scheme 1 is sufficient to cover all possible valid SSB separations. However, for cases A, B and C, sometimes, an SSB that is separated by 2nN samples and scheme 1 does not cover all the valid SSB separations.

Scheme 2 is given in Equation (16):

$$\xi^2_{x,f}\{2nN+\Delta^2_{x,f}(n)\}, n \text{ is any positive integer} \quad (16)$$

Scheme 2 is similar to scheme 1, except scheme 2 expands the set of timing differences by adding more candidates (2nN) as valid SSB separations. This allows covering SSB separations in sub 6 GHz mode. It also introduces more false PSS peaks. However, a PSS peak based pruning scheme (e.g., select the best candidates based on their PSS cross correlation values) works successfully without any apparent performance degradation observed as compared to using a complete valid set of SSB separation ($\xi_{x,f}$).

Set selection is described below, where a set of SSB separations is defined for Scheme 1 and Scheme 2 as described above.

Case A: SCS=15 kHz; f≤3 GHz given in Equations (17) and (18):

$$\xi^1_{Case\ A,f} = \{4nN+\Delta^1_{caseA,f}(n)\}, n \text{ is any positive integer} \quad (17)$$

where $\Delta^1_{caseA,f}(n) = \{2\delta(n-2)+6\delta(n-5)\}$ $$\xi^2_{Case\ A,f} = \{2nN+\Delta^2_{caseA,f}(n)\}, n \text{ is any positive integer} \quad (18)$$

where $\Delta^2_{caseA,f}(n) = \{2\delta(n-3)+2\delta(n-4)+4\delta(n-7)+6\delta(n-10)\}$
N is the length in samples of OFDM symbol not at 0.5 ms boundary;

and where $$\delta(u) = \begin{cases} 1, & \text{if } u = 0 \\ 0, & \text{else} \end{cases}.$$

Case A: SCS=15 kHz; f>3 GHz is given in Equations (19) and (20):

$$\xi^1_{Case\ A,f}=\{4nN+\Delta^1_{caseA,f}(n)\},\ n \text{ is any positive integer} \quad (19)$$

where $\Delta^1_{caseA,f}(n)=\{2\delta(n-2)+6\delta(n-5)+8\delta(n-7)+10\delta(n-9)+14\delta(n-12)\}$ $$\xi^2_{Case\ A,fc}=\{2nN+\Delta^2_{caseA,f}(n)\},\ n \text{ is any positive integer} \quad (20)$$

where $\Delta^2_{caseA,f}(n)=\{2\delta(n-3)+2\delta(n-4)+4\delta(n-7)+6\delta(n-10)+6\delta(n-11)+8\delta(n-14)+10\delta(n-17)+10\delta(n-18)+12\delta(n-21)+14\delta(n-24)\}$ Case B: SCS=30 kHz, pattern 1; f≤3 GHz is given by Equations (21) and (22):

$$\xi^1_{Case\ B,f}=\{4nN+\Delta^1_{caseB,f}(n)\},\ n \text{ is any positive integer} \quad (21)$$

where $\Delta^1_{caseB,f}(n)=\{4\delta(n-2)+4\delta(n-3)+4\delta(n-4)+8\delta(n-4)\}$ $$\xi^2_{Case\ B,f}=\{2nN+\Delta^2_{caseB,f}(n)\},\ n \text{ is any positive integer} \quad (22)$$

$\Delta^2_{caseB,f}(n)=\{4\delta(n-4)+4\delta(n-6)+4\delta(n-8)\}$

Case B: SCS=30 kHz, pattern 1; 3 GHz≤f≤6 GHz is given by Equations (23) and (24):

$$\xi^1_{Case\ B,f}=\{4nN+\Delta^2_{caseB,f}(n)\},\ n \text{ is any positive integer} \quad (23)$$

where $\Delta^1_{caseB,f}(n)=\{4\delta(n-1)+4\delta(n-2)+8\delta(n-3)+8\delta(n-4)+12\delta(n-5)+12\delta(n-6)\}$ $$\xi^2_{Case\ B,f}=\{2nN+\Delta^2_{caseB,f}(n)\},\ n \text{ is any positive integer} \quad (24)$$

$\Delta^2_{caseB,f}(n)=\{4\delta(n-2)+4\delta(n-3)+4\delta(n-4)+4\delta(n-5)+8\delta(n-6)+8\delta(n-7)+8\delta(n-8)+12\delta(n-9)+12\delta(n-10)+12\delta(n-12)\}$ Case C: SCS=30 kHz, pattern 2; f≤3 GHz is given by Equations (25) and (26):

$$\xi^1_{Case\ C,f}=\{4nN+\Delta^2_{case\ C,f}(n)\},\ n \text{ is any positive integer} \quad (25)$$

where $\Delta^1_{caseB,f}(n)=\{4\delta(n-2)+4\delta(n-5)\}$ $$\xi^2_{Case\ C,f}=\{2nN+\Delta^2_{case\ C,f}(n)\},\ n \text{ is any positive integer} \quad (26)$$

where $\Delta^2_{caseB,f}(n)=\{4\delta(n-4)+4\delta(n-7)+4\delta(n-10)\}$

Case C: SCS=30 kHz, pattern 2; 3 GHz≤f<6 GHz is given in Equations (27) and (28):

$$\xi^1_{case\ C,f}=\{4nN+\Delta^2_{caseC,f}(n)\},\ n \text{ is any positive integer} \quad (27)$$

where $\Delta^1_{caseC,f}(n)=\{4\delta(n-2)+4\delta(n-5)+8\delta(n-7)+12\delta(n-9)+12\delta(n-12)\}$ $$\xi^2_{Case\ C,f}=\{2nN+\Delta^2_{caseC,f}(n)\},\ n \text{ is any positive integer} \quad (28)$$

where $\Delta^2_{caseC,f}(n)=\{4\delta(n-4)+4\delta(n-7)+4\delta(n-10)+8\delta(n-11)+8\delta(n-14)+8\delta(n-17)+12\delta(n-18)+12\delta(n-21)+12\delta(n-24)\}$ Case D: SCS=120 KHz (e.g., scheme 1-1) is given by Equation (29):

$$\xi^{1,1}_{case\ D,mmWave} = \{4nN + \Delta^{1,1}_{case\ D,mmWave}(n)\},\ \text{where } N = 274, \quad (29)$$

$n = 0, 1, \ldots, 75, C = 16$ and where $\Delta^{1,1}_{case\ D,mmWave}(n) = \left\{ \left\lfloor \frac{4n+8}{56} \right\rfloor C \right\}$ Scheme 1-2 is given by Equation (30):

$$\Xi^{1,2}_{caseD,mmWave}=\{(56N)n+\Delta^{1,2}_{caseD,mmWave}(n)\}, \quad (30)$$

where N=274, n=0, 1, . . . , 9, C=16
and where $\Delta^{1,2}_{caseD,mmWave}(n)=\{nC\}$ Case E: SCS=240 KHz. (i.e., scheme 1-1) is given by Equation (31):

$$\xi^{1,1}_{caseE,mmWave}=\{4nN+\Delta^{1,1}_{caseE,mmWave}(n)\}, \quad (31)$$

where N=274, n=0, 1, . . . , 75, C=32
and where $$\Delta^{1,1}_{case\ E,mmWave}(n) = \left\{ \left\lfloor \frac{4n+8}{112} \right\rfloor C \right\}$$

Scheme 1-2 is given by Equation (32):

$$\xi^{1,2}_{caseE,mmWave}=\{(112N)n+\Delta^{1,2}_{caseE,mmWave}(n)\}, \quad (32)$$

where N=274, n=0, 1, . . . , 9, C=32
and where $\Delta^{1,2}_{caseE,mmWave}(n)=\{nC\}$ The SSS combining scheme described above with reference to Equations (1), (2), (3), and (4) is an example scheme. According to an embodiment, proper weighting factors for combining may be selected according to the application and channel conditions. The selection of timings set described above is one of the example schemes. The method may be applied for an arbitrary timing separation set based on the intended application and HW complexity.

A method of detecting an SSS repeated in multiple signal blocks spaced apart over a synchronization period of a received signal, a spacing scheme of the signal blocks being one of a plurality of predetermined spacing schemes, each predetermined spacing scheme corresponding to a timing hypothesis, is described below.

At step A, the synchronization period is apportioned into multiple shortened periods.

At step B, for each shortened period, and for each timing hypothesis correlating a reference PSS with the received signal to identify one or more PSS peaks, determining PSS timing of the PSS peaks, storing the PSS timing, determining a set of SSS candidates based on the PSS timing, correlating the SSS candidates with a locally generated SSS signal associated with the timing hypothesis, and storing the SSS candidates and their corresponding correlation values.

After performing step B, at step C, creating a grouping table, based on accumulated PSS timings, that provides candidate locations of SSS candidates to be combined, combining SSS correlation values corresponding to the candidate locations according to weighting factors, and selecting an SSS having a maximum combined correlation value.

Figure 7:
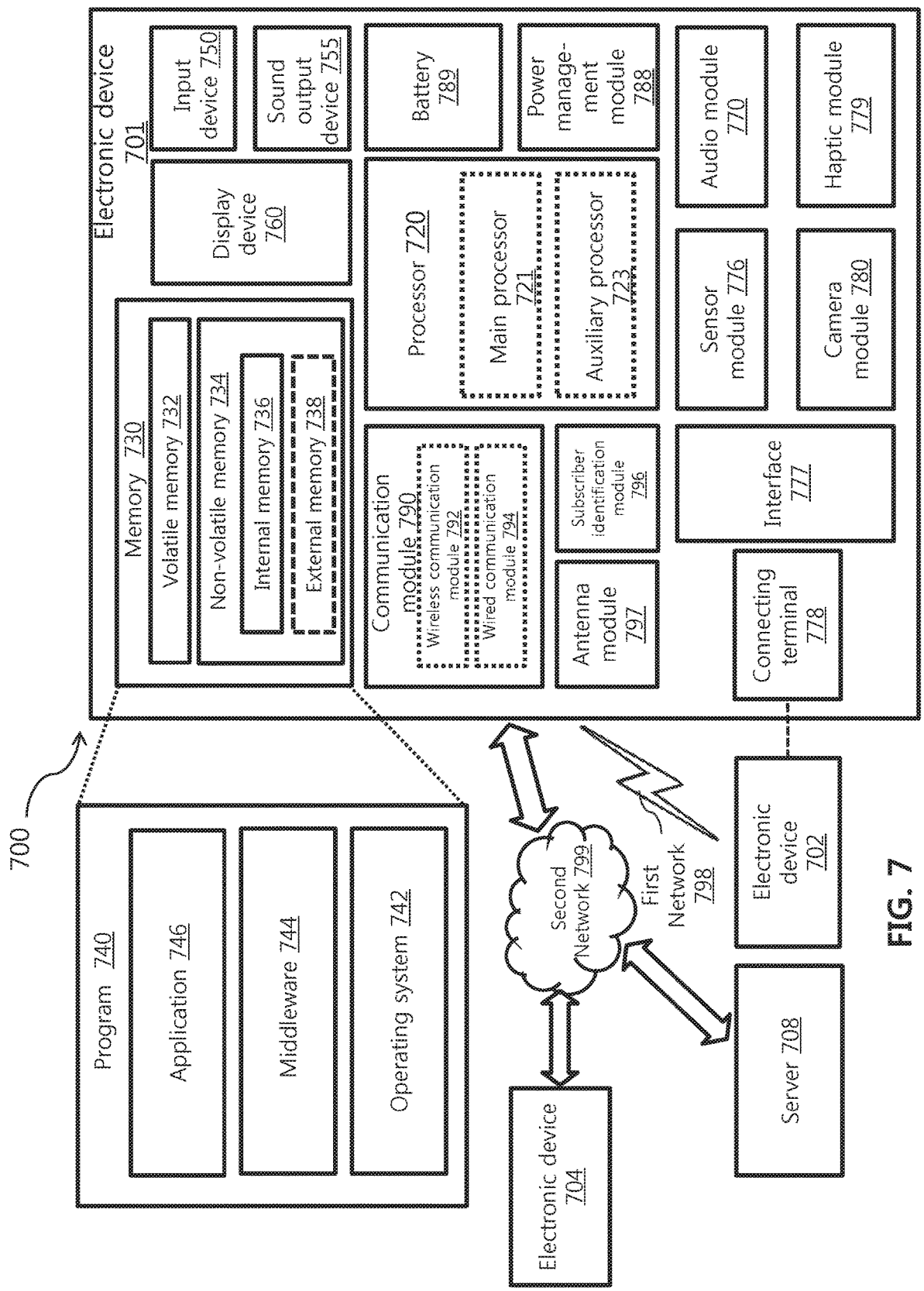
FIG. 7 is a block diagram of an electronic device in a network environment to which an apparatus and a method of the present disclosure is applied, according to one embodiment.

FIG. 7 is a block diagram illustrating an electronic device 701 in a network environment 700 according to various embodiments.

Referring to FIG. 7, the electronic device 701 in the network environment 700 may communicate with an electronic device 702 via a first network 798 (e.g., a short-range wireless communication network), or an electronic device 704 or a server 708 via a second network 799 (e.g., a long-range wireless communication network). According to an embodiment, the electronic device 701 may communicate with the electronic device 704 via the server 708. According to an embodiment, the electronic device 701 may include a processor 720, memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797. In some embodiments, at least one (e.g., the display device 760 or the camera module 780) of the components may be omitted from the electronic device 701, or one or more other components may be added in the electronic device 701. In some embodiments, some of the components may be implemented as single integrated circuitry. For example, the sensor module 776 (e.g., a fingerprint sensor, an iris sensor, or an illuminance sensor) may be implemented as embedded in the display device 760 (e.g., a display).

The processor 720 may execute, for example, software (e.g., a program 740) to control at least one other component (e.g., a hardware or software component) of the electronic device 701 coupled with the processor 720, and may perform various data processing or computation. According to one embodiment, as at least part of the data processing or computation, the processor 720 may load a command or data received from another component (e.g., the sensor module 776 or the communication module 790) in volatile memory 732, process the command or the data stored in the volatile memory 732, and store resulting data in non-volatile memory 734. According to an embodiment, the processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor) that is operable independently from, or in conjunction with, the main processor 721. Additionally or alternatively, the auxiliary processor 723 may be adapted to consume less power than the main processor 721, or to be specific to a specified function. The auxiliary processor 723 may be implemented as separate from, or as part of the main processor 721.

The auxiliary processor 723 may control at least some of functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to an embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, a keyboard, or a digital pen (e.g., a stylus pen).

The sound output device 755 may output sound signals to the outside of the electronic device 701. The sound output device 755 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to an embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to an embodiment, the audio module 770 may obtain the sound via the input device 750, or output the sound via the sound output device 755 or a headphone of an external electronic device (e.g., an electronic device 702) directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. According to an embodiment, the sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device (e.g., the electronic device 702) directly (e.g., wiredly) or wirelessly. According to an embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device (e.g., the electronic device 702). According to an embodiment, the connecting terminal 778 may include, for example, a HDMI connector, a USB connector, a SD card connector, or an audio connector (e.g., a headphone connector).

The haptic module 779 may convert an electrical signal into a mechanical stimulus (e.g., a vibration or a movement) or electrical stimulus which may be recognized by a user via his tactile sensation or kinesthetic sensation. According to an embodiment, the haptic module 779 may include, for example, a motor, a piezoelectric element, or an electric stimulator.

The camera module 780 may capture a still image or moving images. According to an embodiment, the camera module 780 may include one or more lenses, image sensors, image signal processors, or flashes.

The power management module 788 may manage power supplied to the electronic device 701. According to one embodiment, the power management module 788 may be implemented as at least part of, for example, a power management integrated circuit (PMIC).

The battery 789 may supply power to at least one component of the electronic device 701. According to an embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. According to an embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to an embodiment, the antenna module 797 may include an antenna including a radiating element composed of a conductive material or a conductive pattern formed in or on a substrate (e.g., PCB). According to an embodiment, the antenna module 797 may include a plurality of antennas. In such a case, at least one antenna appropriate for a communication scheme used in the communication network, such as the first network 798 or the second network 799, may be selected, for example, by the communication module 790 (e.g., the wireless communication module 792) from the plurality of antennas. The signal or the power may then be transmitted or received between the communication module 790 and the external electronic device via the selected at least one antenna. According to an embodiment, another component (e.g., a radio frequency integrated circuit (RFIC)) other than the radiating element may be additionally formed as part of the antenna module 797.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. According to an embodiment, all or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 740) including one or more instructions that are stored in a storage medium (e.g., internal memory 736 or external memory 738) that is readable by a machine (e.g., the electronic device 701). For example, a processor 720 of the machine (e.g., the electronic device 701) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 8:
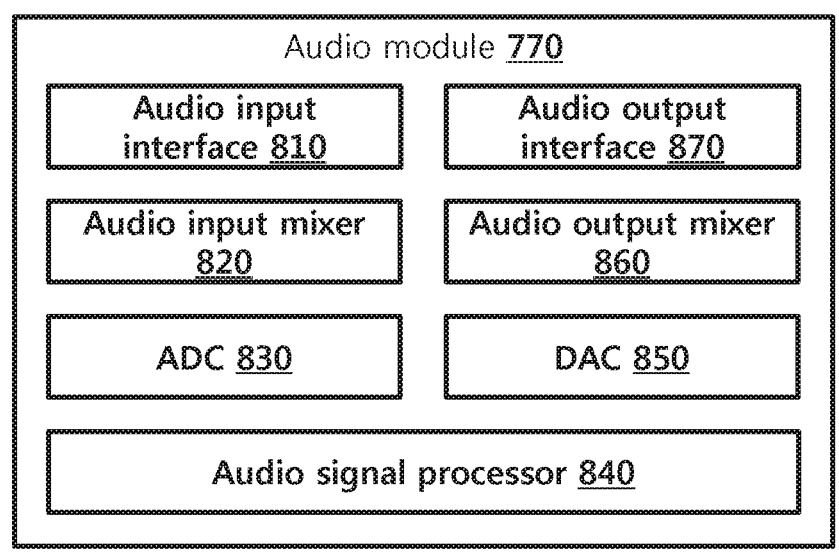
FIG. 8 is a block diagram of an audio module to which an apparatus and a method of the present disclosure is applied, according to one embodiment.

FIG. 8 is a block diagram of the audio module 770, according to one embodiment.

Referring to FIG. 8, the audio module 770 may include, for example, an audio input interface 810, an audio input mixer 820, an analog-to-digital converter (ADC) 830, an audio signal processor 840, a digital-to-analog converter (DAC) 850, an audio output mixer 860, or an audio output interface 870.

The audio input interface 810 may receive an audio signal corresponding to a sound obtained from the outside of the electronic device 701 via a microphone (e.g., a dynamic microphone, a condenser microphone, or a piezo microphone) that is configured as part of the input device 750 or separately from the electronic device 701. For example, if an audio signal is obtained from the external electronic device 702 (e.g., a headset or a microphone), the audio input interface 810 may be connected with the external electronic device 702 directly via the connecting terminal 778, or wirelessly (e.g., Bluetooth™ communication) via the wireless communication module 792 to receive the audio signal. According to one embodiment, the audio input interface 810 may receive a control signal (e.g., a volume adjustment signal received via an input button) related to the audio signal obtained from the external electronic device 702. The audio input interface 810 may include a plurality of audio input channels and may receive a different audio signal via a corresponding one of the plurality of audio input channels, respectively. Additionally or alternatively, the audio input interface 810 may receive an audio signal from another component (e.g., the processor 720 or the memory 730) of the electronic device 701.

The audio input mixer 820 may synthesize a plurality of inputted audio signals into at least one audio signal. For example, according to one embodiment, the audio input mixer 820 may synthesize a plurality of analog audio signals inputted via the audio input interface 810 into at least one analog audio signal.

The ADC 830 may convert an analog audio signal into a digital audio signal. For example, according to one embodiment, the ADC 830 may convert an analog audio signal received via the audio input interface 810 or, additionally or alternatively, an analog audio signal synthesized via the audio input mixer 820 into a digital audio signal.

The audio signal processor 840 may perform various processing on a digital audio signal received via the ADC 830 or a digital audio signal received from another component of the electronic device 701. For example, the audio signal processor 840 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to one embodiment, one or more functions of the audio signal processor 840 may be implemented in the form of an equalizer.

The DAC 850 may convert a digital audio signal into an analog audio signal. For example, according to one embodiment, the DAC 850 may convert a digital audio signal processed by the audio signal processor 840 or a digital audio signal obtained from another component (e.g., the processor 720 or the memory 730) of the electronic device 701 into an analog audio signal.

The audio output mixer 860 may synthesize a plurality of audio signals, which are to be outputted, into at least one audio signal. For example, according to one embodiment, the audio output mixer 860 may synthesize an analog audio signal converted by the DAC 850 and another analog audio signal (e.g., an analog audio signal received via the audio input interface 810) into at least one analog audio signal.

The audio output interface 870 may output an analog audio signal converted by the DAC 850 or, additionally or alternatively, an analog audio signal synthesized by the audio output mixer 860 to the outside of the electronic device 701 via the sound output device 755. The sound output device 755 may include, for example, a speaker, such as a dynamic driver or a balanced armature driver, or a receiver. According to one embodiment, the sound output device 755 may include a plurality of speakers. In such a case, the audio output interface 770 may output audio signals having a plurality of different channels (e.g., stereo channels or 5.1 channels) via at least some of the plurality of speakers. According to one embodiment, the audio output interface 870 may be connected with the external electronic device 702 (e.g., an external speaker or a headset) directly via the connecting terminal 778 or wirelessly via the wireless communication module 792 to output an audio signal.

According to one embodiment, the audio module 770 may generate, without separately including the audio input mixer 820 or the audio output mixer 860, at least one digital audio signal by synthesizing a plurality of digital audio signals using at least one function of the audio signal processor 840.

According to one embodiment, the audio module 770 may include an audio amplifier (e.g., a speaker amplifying circuit) that is capable of amplifying an analog audio signal inputted via the audio input interface 810 or an audio signal that is to be outputted via the audio output interface 870. The audio amplifier may be configured as a module separate from the audio module 770.

Figure 9:
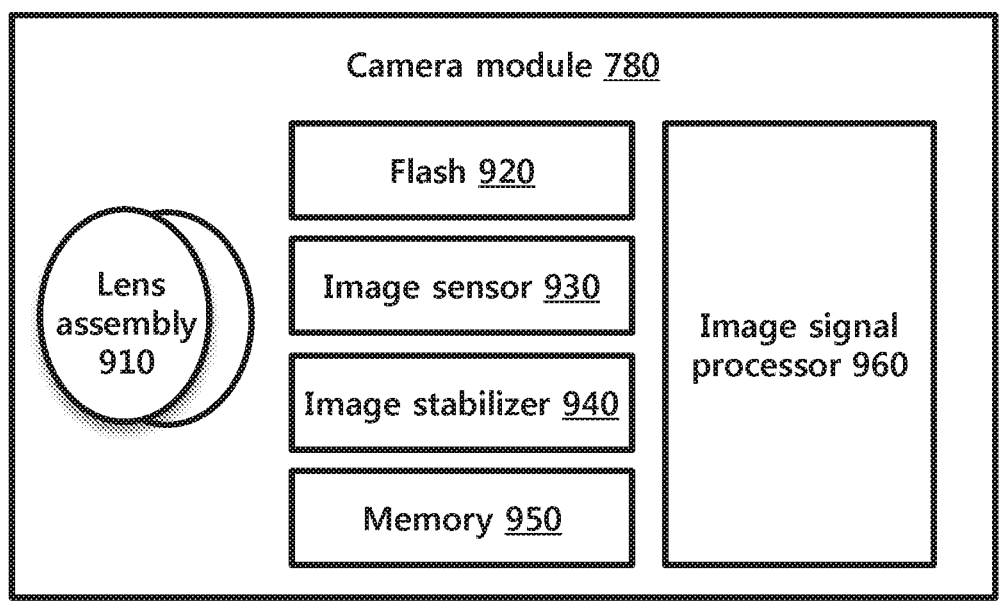
FIG. 9 is a block diagram of a camera module to which an apparatus and a method of the present disclosure is applied, according to one embodiment.

FIG. 9 is a block diagram of the camera module 780, according to one embodiment.

Referring to FIG. 9, the camera module 780 may include a lens assembly 910, a flash 920, an image sensor 930, an image stabilizer 940, a memory 950 (e.g., a buffer memory), or an image signal processor 960. The lens assembly 910 may collect light emitted or reflected from an object whose image is to be taken. The lens assembly 910 may include one or more lenses. According to one embodiment, the camera module 780 may include a plurality of lens assemblies 910. In this case, the camera module 780 may form, for example, a dual camera, a 360-degree camera, or a spherical camera. Some of the plurality of lens assemblies 910 may have the same lens attribute (e.g., view angle, focal length, auto-focusing, f number, or optical zoom), or at least one lens assembly may have one or more lens attributes that are different from those of another lens assembly. The lens assembly 910 may include, for example, a wide-angle lens or a telephoto lens.

The flash 920 may emit light that is used to reinforce light reflected from an object. The flash 920 may include one or more light emitting diodes (LEDs) (e.g., a red-green-blue (RGB) LED, a white LED, an infrared (IR) LED, or an ultraviolet (UV) LED) or a xenon lamp. The image sensor 930 may obtain an image corresponding to an object by converting light emitted or reflected from the object and transmitted via the lens assembly 910 into an electrical signal. According to one embodiment, the image sensor 930 may be selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 930 may be implemented using, for example, a charged coupled device (CCD) sensor or a complementary metal oxide semiconductor (CMOS) sensor.

The image stabilizer 840 may move the image sensor 930 or at least one lens included in the lens assembly 910 in a particular direction, or control an operational attribute (e.g., adjust the read-out timing) of the image sensor 930 in response to the movement of the camera module 780 or the electronic device 701 including the camera module 780. This allows compensating for at least part of a negative effect (e.g., image blurring) by the movement on an image being captured. According to one embodiment, the image stabilizer 940 may sense such a movement by the camera module 780 or the electronic device 701 using a gyro sensor or an acceleration sensor disposed inside or outside the camera module 780. The image stabilizer 940 may be implemented, for example, as an optical image stabilizer.

The memory 950 may store, at least temporarily, at least part of an image obtained via the image sensor 930 for a subsequent image processing task. For example, if image capturing is delayed due to shutter lag or multiple images are quickly captured, a raw image obtained (e.g., a Bayer-patterned image, a high-resolution image) may be stored in the memory 950, and its corresponding copy image (e.g., a low-resolution image) may be previewed via the display device 760. Thereafter, if a specified condition is met (e.g., by a user's input or system command), at least part of the raw image stored in the memory 950 may be obtained and processed, for example, by the image signal processor 960. According to one embodiment, the memory 950 may be configured as at least part of the memory 730 or as a separate memory that is operated independently from the memory 730.

The image signal processor 960 may perform one or more image processing with respect to an image obtained via the image sensor 930 or an image stored in the memory 950. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 960 may perform control (e.g., exposure time control or read-out timing control) with respect to at least one (e.g., the image sensor 930) of the components included in the camera module 780. An image processed by the image signal processor 960 may be stored in the memory 950 for further processing, or may be provided to an external component (e.g., the memory 730, the display device 760, the electronic device 702, the electronic device 704, or the server 708) outside the camera module 780. According to one embodiment, the image signal processor 960 may be configured as at least part of the processor 720, or as a separate processor that is operated independently from the processor 720. If the image signal processor 960 is configured as a separate processor from the processor 720, at least one image processed by the image signal processor 960 may be displayed, by the processor 720, via the display device 760 as it is or after being further processed.

According to one embodiment, the electronic device 701 may include a plurality of camera modules 780 having different attributes or functions. In this case, at least one of the plurality of camera modules 780 may form, for example, a wide-angle camera and at least another of the plurality of camera modules 780 may form a telephoto camera. Similarly, at least one of the plurality of camera modules 780 may form, for example, a front camera and at least another of the plurality of camera modules 780 may form a rear camera.

Figure 10:
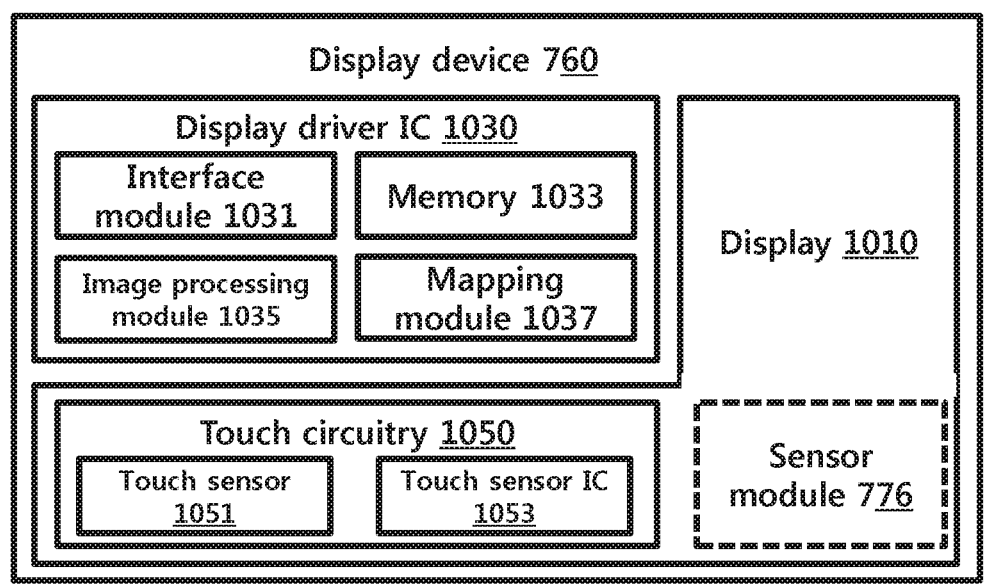
FIG. 10 is a block diagram of a display device to which an apparatus and a method of the present disclosure is applied, according to one embodiment.

FIG. 10 is a block diagram of the display device 760, according to one embodiment.

Referring to FIG. 10, the display device 760 may include a display 1010 and a display driver integrated circuit (DDI) 1030 to control the display 1010. The DDI 1030 may include an interface module 1031, a memory 1033 (e.g., a buffer memory), an image processing module 1035, or a mapping module 1037. The DDI 1030 may receive image information that contains image data or an image control signal corresponding to a command to control the image data from another component of the electronic device 701 via the interface module 1031. For example, according to one embodiment, the image information may be received from the processor 720 (e.g., the main processor 721 (e.g., an AP)) or the auxiliary processor 723 (e.g., a graphics processing unit) operated independently from the function of the main processor 721. The DDI 1030 may communicate, for example, with touch circuitry 1050 or the sensor module 1076 via the interface module 1031. The DDI 1030 may also store at least part of the received image information in the memory 1033, for example, on a frame by frame basis.

The image processing module 1035 may perform pre-processing or post-processing (e.g., adjustment of resolution, brightness, or size) with respect to at least part of the image data. According to one embodiment, the pre-processing or post-processing may be performed, for example, based at least in part on one or more characteristics of the image data or one or more characteristics of the display 1010.

The mapping module 1037 may generate a voltage value or a current value corresponding to the image data pre-processed or post-processed by the image processing module 1035. According to one embodiment, generation of the voltage value or current value may be performed, for example, based at least in part on one or more attributes of the pixels (e.g., an array, such as an RGB stripe or a pentile structure, of the pixels, or the size of each subpixel). At least some pixels of the display 1010 may be driven, for example, based at least in part on the voltage value or the current value such that visual information (e.g., a text, an image, or an icon) corresponding to the image data may be displayed via the display 1010.

The display device 760 may further include the touch circuitry 1050. The touch circuitry 1050 may include a touch sensor 1051 and a touch sensor IC 1053 to control the touch sensor 1051. The touch sensor IC 953 may control the touch sensor 1051 to sense a touch input or a hovering input with respect to a certain position on the display 1010. To achieve this, for example, the touch sensor 1051 may detect (e.g., measure) a change in a signal (e.g., a voltage, a quantity of light, a resistance, or a quantity of one or more electrical charges) corresponding to the certain position on the display 1010. The touch circuitry 1050 may provide input information (e.g., a position, an area, a pressure, or a time) indicative of the touch input or the hovering input detected via the touch sensor 1051 to the processor 720. According to one embodiment, at least part (e.g., the touch sensor IC 1053) of the touch circuitry 1050 may be formed as part of the display 1010 or the DDI 1030, or as part of another component (e.g., the auxiliary processor 723) disposed outside the display device 760.

The display device 760 may further include at least one sensor (e.g., a fingerprint sensor, an iris sensor, a pressure sensor, or an illuminance sensor) of the sensor module 776 or a control circuit for the at least one sensor. In this case, the at least one sensor or the control circuit for the at least one sensor may be embedded in one portion of a component (e.g., the display 1010, the DDI 1030, or the touch circuitry 1050)) of the display device 760. For example, when the sensor module 776 embedded in the display device 760 includes a biometric sensor (e.g., a fingerprint sensor), the biometric sensor may obtain biometric information (e.g., a fingerprint image) corresponding to a touch input received via a portion of the display 1010. For example, when the sensor module 1076 embedded in the display device 760 includes a pressure sensor, the pressure sensor may obtain pressure information corresponding to a touch input received via a partial or whole area of the display 1010. According to one embodiment, the touch sensor 1051 or the sensor module 1076 may be disposed between pixels in a pixel layer of the display 1010, or over or under the pixel layer.

Figure 11:
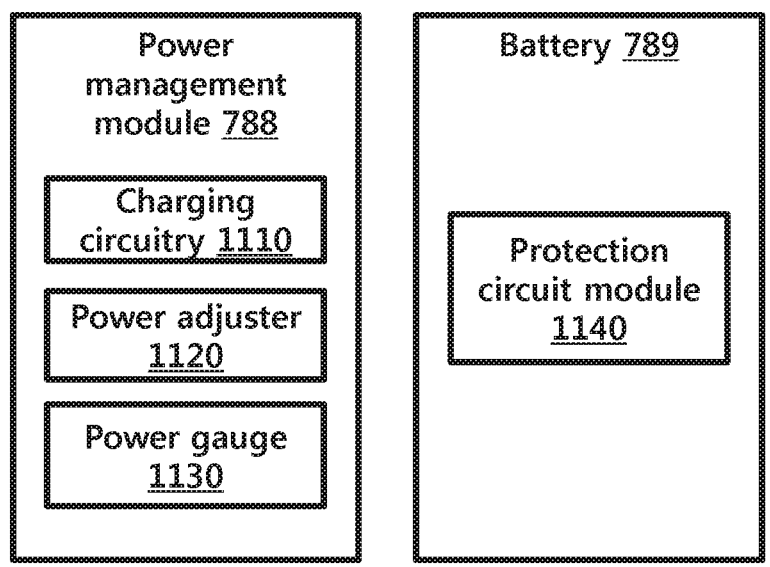
FIG. 11 is a block diagram of a power management module and a battery to which an apparatus and a method of the present disclosure is applied, according to one embodiment.

FIG. 11 is a block diagram of the power management module 788 and the battery 789, according to one embodiment.

Referring to FIG. 11, the power management module 788 may include charging circuitry 1110, a power adjuster 1120, or a power gauge 1130. The charging circuitry 1110 may charge the battery 789 by using power supplied from an external power source outside the electronic device 701. According to one embodiment, the charging circuitry 1110 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 789, and may charge the battery 789 using the selected charging scheme. The external power source may be connected with the electronic device 701, for example, directly via the connecting terminal 778 or wirelessly via the antenna module 797.

The power adjuster 1120 may generate a plurality of powers having different voltage levels or different current levels by adjusting a voltage level or a current level of the power supplied from the external power source or the battery 789. The power adjuster 1120 may adjust the voltage level or the current level of the power supplied from the external power source or the battery 789 into a different voltage level or current level appropriate for each of some of the components included in the electronic device 701. According to one embodiment, the power adjuster 1120 may be implemented in the form of a low drop out (LDO) regulator or a switching regulator. The power gauge 1130 may measure use state information about the battery 789 (e.g., a capacity, a number of times of charging or discharging, a voltage, or a temperature of the battery 789).

The power management module 788 may determine, using, for example, the charging circuitry 1110, the power adjuster 1120, or the power gauge 1130, charging state information (e.g., lifetime, over voltage, low voltage, over current, over charge, over discharge, overheating, a short, or swelling) related to the charging of the battery 789 based at least in part on the measured use state information about the battery 789. The power management module 788 may determine whether the state of the battery 789 is normal or abnormal based at least in part on the determined charging state information. If the state of the battery 789 is determined to be abnormal, the power management module 788 may adjust the charging of the battery 789 (e.g., reduce the charging current or voltage, or stop the charging). According to one embodiment, at least some of the functions of the power management module 788 may be performed by an external control device (e.g., the processor 720).

The battery 789, according to one embodiment, may include a protection circuit module (PCM) 1140. The PCM 1140 may perform one or more of various functions (e.g., a pre-cutoff function) to prevent performance degradation of, or damage to, the battery 789. The PCM 1140, additionally or alternatively, may be configured as at least part of a battery management system (BMS) capable of performing various functions including cell balancing, measurement of battery capacity, count of a number of charging or discharging, measurement of temperature, or measurement of voltage.

According to one embodiment, at least part of the charging state information or use state information regarding the battery 789 may be measured using a corresponding sensor (e.g., a temperature sensor) of the sensor module 776, the power gauge 1130, or the power management module 788. The corresponding sensor (e.g., a temperature sensor) of the sensor module 776 may be included as part of the PCM 1140, or may be disposed near the battery 789 as a separate device.

Figure 12:
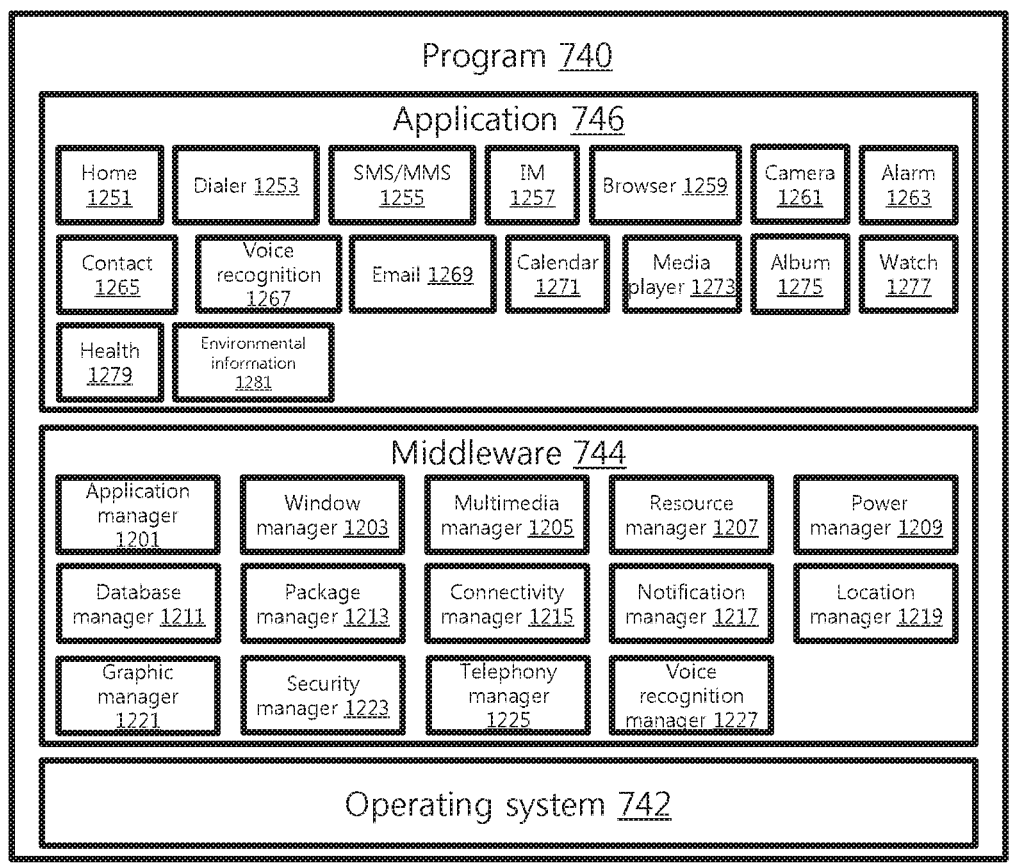
FIG. 12 is a block diagram of a program to which an apparatus and a method of the present disclosure is applied, according to one embodiment.

FIG. 12 is a block diagram of the program 740 according to one embodiment.

Referring to FIG. 12, the program 740 may include an OS 742 to control one or more resources of the electronic device 701, middleware 744, or an application 746 executable in the OS 742. The OS 742 may include, for example, Android®, iOS®, Windows®, Symbian®, Tizen®, or Bada™. At least part of the program 740, for example, may be pre-loaded on the electronic device 701 during manufacture, or may be downloaded from or updated by an external electronic device (e.g., the electronic device 702 or 704, or the server 708) during use by a user.

The OS 742 may control management (e.g., allocating or deallocation) of one or more system resources (e.g., process, memory, or power source) of the electronic device 701. The OS 742, additionally or alternatively, may include one or more driver programs to drive other hardware devices of the electronic device 701, for example, the input device 750, the sound output device 755, the display device 760, the audio module 770, the sensor module 776, the interface 777, the haptic module 779, the camera module 780, the power management module 788, the battery 789, the communication module 790, the subscriber identification module 796, or the antenna module 797.

The middleware 744 may provide various functions to the application 746 such that a function or information provided from one or more resources of the electronic device 701 may be used by the application 746. The middleware 744 may include, for example, an application manager 1201, a window manager 1203, a multimedia manager 1205, a resource manager 1207, a power manager 1209, a database manager 1211, a package manager 1213, a connectivity manager 1215, a notification manager 1217, a location manager 1219, a graphic manager 1221, a security manager 1223, a telephony manager 1225, or a voice recognition manager 1227.

The application manager 1201, for example, may manage the life cycle of the application 746. The window manager 1203, for example, may manage one or more graphical user interface (GUI) resources that are used on a screen. The multimedia manager 1205, for example, may identify one or more formats to be used to play media files, and may encode or decode a corresponding one of the media files using a codec appropriate for a corresponding format selected from the one or more formats. The resource manager 1207, for example, may manage the source code of the application 746 or a memory space of the memory 730. The power manager 1209, for example, may manage the capacity, temperature, or power of the battery 789, and determine or provide related information to be used for the operation of the electronic device 701 based at least in part on corresponding information of the capacity, temperature, or power of the battery 789. According to one embodiment, the power manager 1209 may interoperate with a basic input/output system (BIOS) of the electronic device 701.

The database manager 1211, for example, may generate, search, or change a database to be used by the application 746. The package manager 1213, for example, may manage installation or update of an application that is distributed in the form of a package file. The connectivity manager 1215, for example, may manage a wireless connection or a direct connection between the electronic device 701 and the external electronic device. The notification manager 1217, for example, may provide a function to notify a user of an occurrence of a specified event (e.g., an incoming call, message, or alert). The location manager 1219, for example, may manage locational information on the electronic device 701. The graphic manager 1221, for example, may manage one or more graphic effects to be offered to a user or a user interface related to the one or more graphic effects.

The security manager 1223, for example, may provide system security or user authentication. The telephony manager 1225, for example, may manage a voice call function or a video call function provided by the electronic device 701. The voice recognition manager 1227, for example, may transmit a user's voice data to the server 708, and receive, from the server 708, a command corresponding to a function to be executed on the electronic device 701 based at least in part on the voice data, or text data converted based at least in part on the voice data. According to one embodiment, the middleware 744 may dynamically delete some existing components or add new components. According to one embodiment, at least part of the middleware 744 may be included as part of the OS 742 or may be implemented in other software separate from the OS 742.

The application 746 may include, for example, a home application 1251, a dialer application 1253, a short message service (SMS)/multimedia messaging service (MMS) application 1255, an instant message (IM) application 1257, a browser application 1259, a camera application 1261, an alarm application 1263, a contact application 1265, a voice recognition application 1267, an email application 1269, a calendar application 1271, a media player application 1273, an album application 1275, a watch application 1277, a health application 1279 (e.g., for measuring the degree of workout or biometric information, such as blood sugar), or an environmental information application 1281 (e.g., for measuring air pressure, humidity, or temperature information). According to one embodiment, the application 746 may further include an information exchanging application that is capable of supporting information exchange between the electronic device 701 and the external electronic device. The information exchange application, for example, may include a notification relay application adapted to transfer designated information (e.g., a call, a message, or an alert) to the external electronic device or a device management application adapted to manage the external electronic device. The notification relay application may transfer notification information corresponding to an occurrence of a specified event (e.g., receipt of an email) at another application (e.g., the email application 1269) of the electronic device 701 to the external electronic device. Additionally or alternatively, the notification relay application may receive notification information from the external electronic device and provide the notification information to a user of the electronic device 701.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 13:
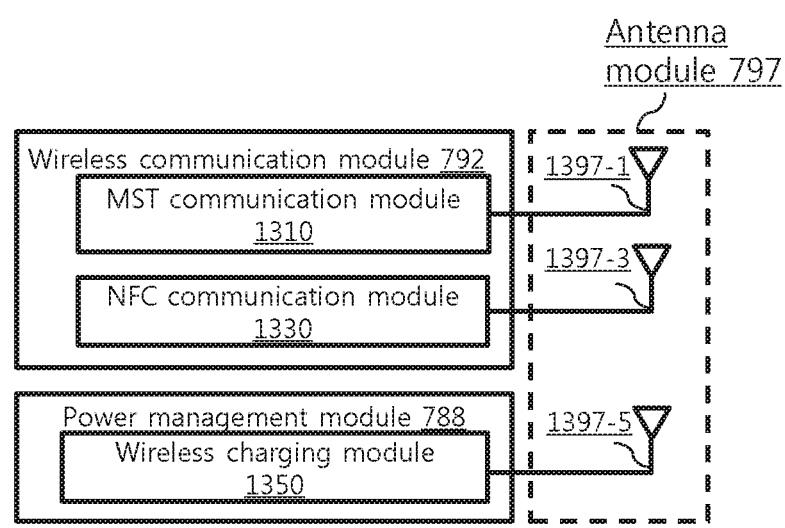
FIG. 13 is a block diagram of a wireless communication module, a power management module, and an antenna module of an electronic device to which an apparatus and a method of the present disclosure is applied, according to one embodiment, according to one embodiment.

FIG. 13 is a block diagram of the wireless communication module 792, the power management module 788, and the antenna module 797 of the electronic device 701, according to one embodiment.

Referring to FIG. 13, the wireless communication module 792 may include a magnetic secure transmission (MST) communication module 1310 or a near-field communication (NFC) module 1330, and the power management module 788 may include a wireless charging module 1350. In this case, the antenna module 797 may include a plurality of antennas that include an MST antenna 1397-1 connected with the MST communication module 1310, an NFC antenna 1397-3 connected with the NFC communication module 1330, and a wireless charging antenna 1397-5 connected with the wireless charging module 1350. Descriptions of components described above with regard to FIG. 7 are either briefly described or omitted here.

The MST communication module 1310 may receive a signal containing control information or payment information such as card (e.g., credit card) information from the processor 720, generate a magnetic signal corresponding to the received signal, and then transfer the generated magnetic signal to the external electronic device 702 (e.g., a point-of-sale (POS) device) via the MST antenna 1397-1. To generate the magnetic signal, according to one embodiment, the MST communication module 1310 may include a switching module that includes one or more switches connected with the MST antenna 1397-1, and control the switching module to change the direction of voltage or current supplied to the MST antenna 1397-1 according to the received signal. The change of the direction of the voltage or current allows the direction of the magnetic signal (e.g., a magnetic field) emitted from the MST antenna 1397-1 to change accordingly. If detected at the external electronic device 702, the magnetic signal with its direction changing may cause an effect (e.g., a waveform) similar to that of a magnetic field that is generated when a magnetic card corresponding to the card information associated with the received signal is swiped through a card reader of the electronic device 702. According to one embodiment, for example, payment-related information and a control signal that are received by the electronic device 702 in the form of the magnetic signal may be further transmitted to an external server 708 (e.g., a payment server) via the network 799.

The NFC communication module 1330 may obtain a signal containing control information or payment information such as card information from the processor 720 and transmit the obtained signal to the external electronic device 702 via the NFC antenna 1397-3. According to one embodiment, the NFC communication module 1330 may receive such a signal transmitted from the external electronic device 702 via the NFC antenna 1397-3.

The wireless charging module 1350 may wirelessly transmit power to the external electronic device 702 (e.g., a cellular phone or wearable device) via the wireless charging antenna 1397-5, or wirelessly receive power from the external electronic device 702 (e.g., a wireless charging device). The wireless charging module 1350 may support one or more of various wireless charging schemes including, for example, a magnetic resonance scheme or a magnetic induction scheme.

According to one embodiment, some of the MST antenna 1397-1, the NFC antenna 1397-3, or the wireless charging antenna 1397-5 may share at least part of their radiators. For example, the radiator of the MST antenna 1397-1 may be used as the radiator of the NFC antenna 1397-3 or the wireless charging antenna 1397-5, or vice versa. In this case, the antenna module 797 may include a switching circuit adapted to selectively connect (e.g., close) or disconnect (e.g., open) at least part of the antennas 1397-1, 1397-3, and 1397-5, for example, under control of the wireless communication module 792 (e.g., the MST communication module 1310 or the NFC communication module 1330) or the power management module (e.g., the wireless charging module 1350). For example, when the electronic device 701 uses a wireless charging function, the NFC communication module 1330 or the wireless charging module 1350 may control the switching circuit to temporarily disconnect at least one portion of the radiators shared by the NFC antenna 1397-3 and the wireless charging antenna 1397-5 from the NFC antenna 1397-3 and to connect the at least one portion of the radiators with the wireless charging antenna 1397-5.

According to one embodiment, at least one function of the MST communication module 1310, the NFC communication module 1330, or the wireless charging module 1350 may be controlled by an external processor (e.g., the processor 720). At least one specified function (e.g., a payment function) of the MST communication module 1310 or the NFC communication module 1330 may be performed in a trusted execution environment (TEE). The TEE may form an execution environment in which, for example, at least some designated area of the memory 1330 is allocated to be used for performing a function (e.g., a financial transaction or personal information-related function) that requires a relatively high level of security. In this case, access to the at least some designated area of the memory 730 may be restrictively permitted, for example, according to an entity accessing thereto or an application being executed in the TEE.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:
1. An apparatus, comprising:
a processor configured to:
receive repetitions of a synchronization signal (SS), the SS comprising a plurality of SS blocks, and each SS block comprising at least a primary spreading signal (PSS) and a secondary spreading signal (SSS),
identify timing of the SS based on a strongest received PSS in the SS,
identify tentative SSSs based on the identified timing of the SS, and
group the tentative SSSs based on the identified timing of the SS and a defined timing pattern of the repetitions of the SS;
a register configured to receive the repetitions of the SS; and a memory configured to store the tentative SSSs for each group of the tentative SSSs;

wherein the processor is further configured to cross correlate the SS with an SSS code book to locally generate SSS candidates, cross correlate each tentative SSS with the locally generated SSS candidates to generate cross correlated outputs, combine the cross correlated outputs with respective weights for each group of the tentative SSSs, determine an SSS as the tentative SSS with a maximum combined cross correlation outputs, and determine a cell identification based on the determined SSS.

2. The apparatus of claim 1, wherein each SS block further comprises at least one physical broadcast channel (PBCH) sequence, and at least one cyclic prefix (CP).

3. The apparatus of claim 1, wherein the processor is further configured to estimate a channel between a base station (BS) and a user equipment (UE) based on the identified timing.

4. The apparatus of claim 1, wherein the processor is further configured to determine the cell ID by computing $3N_{ID}^{(1)}+N_{ID}^{(2)}$, where $N_{ID}^{(1)}$ is a secondary cell ID (SID), and $N_{ID}^{(2)}$ is a primary cell ID (PID).

5. The apparatus of claim 1, wherein there is a time separation between the PSS and a tentative SSS that is predetermined.

6. The apparatus of claim 1, wherein the processor is further configured to cross correlate the SS with the SSS code book using a sliding window SSS correlation.

7. The apparatus of claim 1, wherein the processor is further configured to identify the tentative SSSs based on the identified timing based on the identified timing over one of a complete set of candidate locations or over multiple shortened observation windows.

8. A method, comprising:
receiving repetitions of a synchronization signal (SS), the SS comprising a plurality of SS blocks, and each SS block comprising at least a primary spreading signal (PSS) and a secondary spreading signal (SSS);
identifying timing of the SS using a strongest received PSS;
identifying tentative SSSs based on the identified timing of the SS;
grouping the tentative SSSs that can be grouped based on the identified timing of the SS and a defined timing pattern of the repetitions of the SS;
cross correlating the SS with an SSS code book to locally generate SSS candidates;
cross correlating each tentative SSS with the locally generated SSS candidates to generate cross correlated outputs;
combining the cross correlated outputs with respective weights for each group of the tentative SSSs:
determining an SSS as the tentative SSS with a maximum combined cross correlation output; and
determining a cell identification (ID) based on the determined SSS.

9. The method of claim 8, wherein the SS block further comprises at least one physical broadcast channel (PBCH) sequence, and at least one cyclic prefix (CP).

10. The method of claim 8, further comprising estimating a channel between a base station (BS) and a user equipment (UE) based on the identified timing.

11. The method of claim 8, wherein determining the cell ID comprises computing $3N_{ID}^{(1)}+N_{ID}^{(2)}$, where $N_{ID}^{(1)}$ is a secondary cell ID (SID), and $N_{ID}^{(2)}$ is a primary cell ID (PID).

12. The method of claim 8, wherein there is a time separation between the PSS and a tentative SSS that is predetermined.

13. The method of claim 8, wherein the SS is cross correlated with the SSS code book using a sliding window SSS correlation.

14. The method of claim 8, wherein identifying tentative SSSs based on the identified timing is comprised of identifying tentative SSSs based on the identified timing over one of a complete set of candidate locations or over multiple shortened observation windows.

15. An apparatus, comprising:
a processor configured to:
receive repetitions of a synchronization signal (SS), the SS comprising a plurality of SS blocks, and each SS block comprising at least a primary spreading signal (PSS) and a secondary spreading signal (SSS);
identify timing of the SS based on a strongest received PSS in the SS,
identify tentative SSSs based on the identified timing of the SS, and
group n tentative SSSs into each of n groups based on the identified timing of the SS and a defined timing pattern of the repetitions of the SS, where n is an integer;
a register configured to receive the SS;
n×n SSS correlators, where each of the n SSS correlators is connected to one of the n tentative SSSs in one of the n groups and includes SSS candidates locally generated by cross correlating the SS with an SSS code book;
n×n multipliers, where each of the n multipliers is connected to one of the n SSSs correlators and receives a weight; and
n adders, where each of the n adders is connected to n of the n SSSs multipliers associated with one of the n groups, respectively, where an output of each of the n adders is connected to the processor,
wherein the processor is further configured to determine an SSS as the tentative SSS with a maximum output of the n adders, and determine a cell identification based on the determined SSS.

* * * * *